(12) United States Patent
Langkabel et al.

(10) Patent No.: US 9,707,885 B2
(45) Date of Patent: Jul. 18, 2017

(54) MOTOR VEHICLE WITH DRIVER'S GAZE CONTROLLED HEADLAMP AND METHOD

(71) Applicant: GM GLOBAL TECHNOLOGY OPERATIONS LLC, Detroit, MI (US)

(72) Inventors: Frank Langkabel, Rüsselsheim (DE); Philipp Roeckl, Aschaffenburg (DE); Ingolf Schneider, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 72 days.

(21) Appl. No.: 14/843,225

(22) Filed: Sep. 2, 2015

(65) Prior Publication Data
US 2016/0068097 A1 Mar. 10, 2016

(30) Foreign Application Priority Data
Sep. 4, 2014 (DE) .......................... 10 2014 013 165

(51) Int. Cl.
| | | |
|---|---|---|
| *B60Q 1/08* | (2006.01) | |
| *B60Q 1/16* | (2006.01) | |
| *B60Q 1/14* | (2006.01) | |
| *H05B 37/02* | (2006.01) | |

(52) U.S. Cl.
CPC ............ *B60Q 1/1423* (2013.01); *B60Q 1/085* (2013.01); *B60Q 1/16* (2013.01); *H05B 37/0227* (2013.01); *B60Q 2300/23* (2013.01)

(58) Field of Classification Search
CPC ... B60Q 1/04; B60Q 1/06; B60Q 1/08; B60Q 1/16; F21S 48/17
See application file for complete search history.

(56) References Cited

U.S. PATENT DOCUMENTS

| | | | | |
|---|---|---|---|---|
| 8,033,697 | B2* | 10/2011 | Fang ...................... | B60Q 1/085 362/268 |
| 8,814,401 | B2* | 8/2014 | Higgins-Luthman .. | B60Q 1/085 362/465 |
| 9,068,714 | B2* | 6/2015 | Takahira ................... | F21V 7/06 |
| 9,319,650 | B2* | 4/2016 | Katsumi .............. | H04N 9/3185 |
| 2015/0377442 | A1* | 12/2015 | Bhakta .................. | F21S 48/125 362/510 |
| 2016/0152173 | A1* | 6/2016 | Mayer ................... | B60Q 1/085 362/466 |

FOREIGN PATENT DOCUMENTS

| | | |
|---|---|---|
| DE | 102004005816 A1 | 9/2005 |
| DE | 102012009908 A1 | 1/2013 |
| DE | 102013002211 A1 | 8/2014 |
| DE | 102013104276 A1 | 10/2014 |

* cited by examiner

*Primary Examiner* — Ismael Negron
(74) *Attorney, Agent, or Firm* — Lorenz & Kopf LLP

(57) ABSTRACT

A motor vehicle includes a headlamp configured to project an adjustable light beam; a plurality of cameras positioned at different locations in the motor vehicle and oriented to capture a head of a driver; a controller in data communication with the cameras to determine at least one region of attention of the driver from data captured by the cameras, and adaptively control the light beam of the headlamp based on the region of attention of the driver.

14 Claims, 2 Drawing Sheets

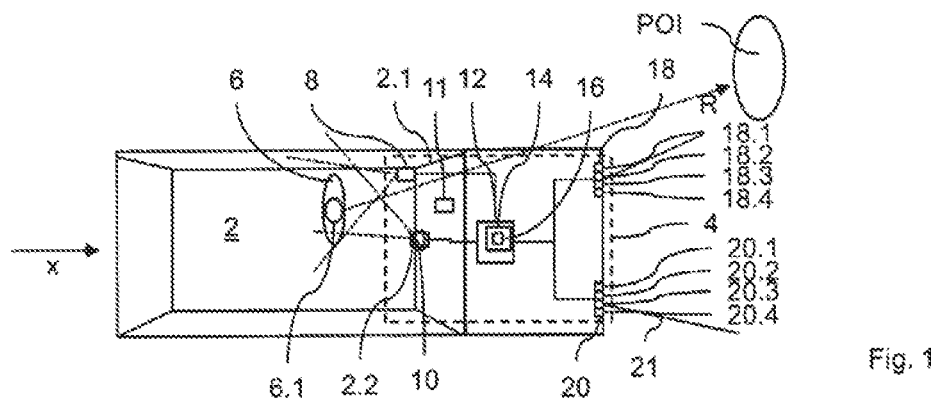
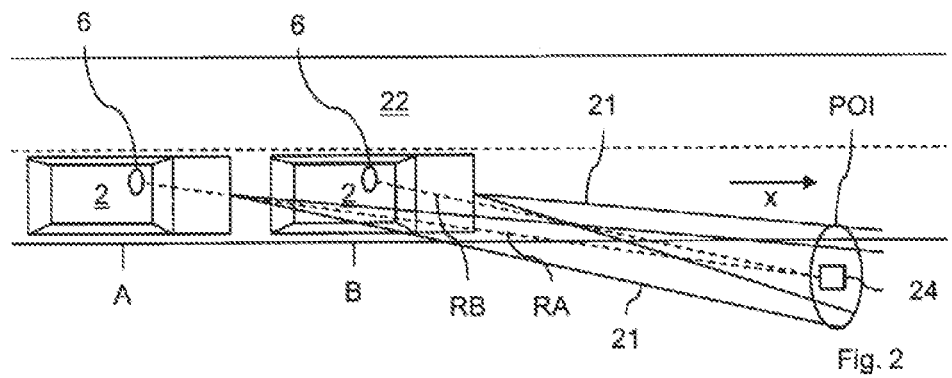
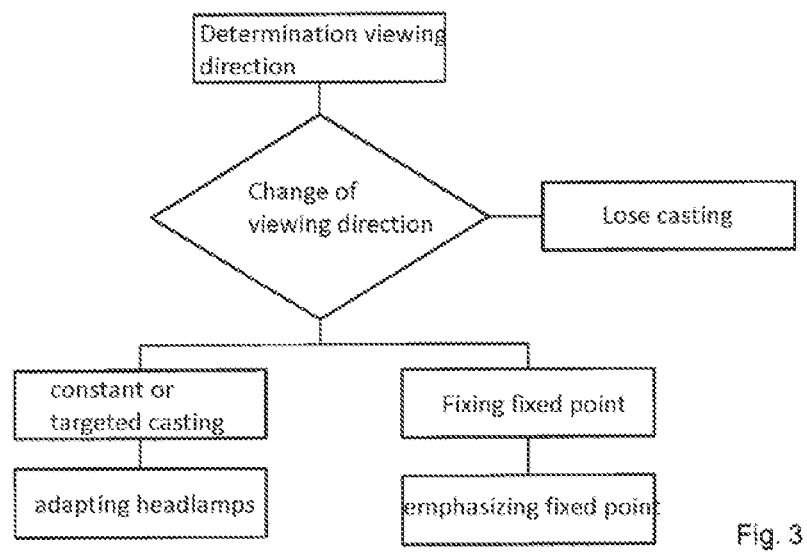

MOTOR VEHICLE WITH DRIVER'S GAZE CONTROLLED HEADLAMP AND METHOD

CROSS-REFERENCE TO RELATED APPLICATION

This application claims priority to German Patent Application No. 102014013165.3, filed Sep. 4, 2014, which is incorporated herein by reference in its entirety.

TECHNICAL FIELD

The present disclosure pertains to a motor vehicle having a headlamp directed towards the front, the light beam of which is adaptable, wherein a controller for adapting the light beam of the headlamp is provided. A method for controlling the headlamp of a vehicle is also provided.

BACKGROUND

Almost all motor vehicles have front headlamps which are adjustable in a certain manner. Most headlamps are adjustable to influence the light beam by changing between low-beam light and high-beam light. Some motor vehicles may also include a headlamp height adjustment, which takes into account different load states of the motor vehicle. Furthermore, motor vehicles are known which have a bending light. There, the illumination of the region in front of the motor vehicle is changed when travelling through a curve so that the region on the curve inside is better illuminated. Thus, a headlamp may use a controller for adapting the light beam which suitably activates the headlamp or the headlamps. Some systems allow swiveling the headlamps.

Furthermore, systems for monitoring the driver of a motor vehicle are known, in which monitor a driver with the help of cameras and output a warning on detecting a sign of tiredness. To this end, eye movements and eyelid movements of the driver can be evaluated.

DE 10 2012 009 908 A1 discloses a method and a device for controlling the illumination of a traffic situation. The motor vehicles are equipped with illumination systems, which include at least low-beam light and high-beam light. In the case of at least two motor vehicles, which exchange data by means of car-to-car communication, for example exchanging data which includes at least illumination parameters of the respective motor vehicle, it is provided that each involved motor vehicle takes into account the received data of the other involved motor vehicles in adapting the own illumination parameters, in order to optimize the illumination of a traffic situation.

Driving a motor vehicle in darkness is a complex task for the driver. The driver has to assess the traffic situation from limited information that is available during darkness (as compared to daytime) in order to be able to act and react to a given situation. Through uneven illumination, some objects may be less visible or hidden in the semi-dark and thus only become identifiable at a late stage or only after extended contemplation. This may delay a driver's reaction to such objects during the driving task.

SUMMARY

In accordance with the present disclosure, devices and methods of the type mentioned at the outset are developed so that illumination that is optimized to suit the situation. In an embodiment, a motor vehicle includes at least one headlamp directed in travelling direction towards the front which generates an adaptable light beam. For adapting the light beam of the headlamp, a controller is provided which controls the light beam by means of input signals. Different input signals can cause the controller to suitably adapt the light beam. Furthermore, at least one camera is arranged in a passenger compartment of the motor vehicle which is oriented so that it captures a head of driver. The camera is arranged in particular so that it captures the face of a driver. The camera is connected to the controller for data communication. The controller is configured to determine a viewing direction of the driver from data transmitted by the camera. The controller is configured to determine at least one region of attention of the driver. The region of attention is the region in the viewing direction of the driver, which holds the current attention of the driver. The controller is also configured to adapt the light beam of the headlamp as a function of the region of attention of the driver, so that the region of attention of the driver is emphasized.

In this way it is possible to thoroughly illuminate the region in front of the motor vehicle observed by the driver in each case, so that the driver can quickly and reliably realize what is present in the respective region. In addition, the region that is observed in each case can be thoroughly illuminated, which is less tiring for the driver, since he or she has to exert less effort for understanding the traffic situation. Consequently a quicker realization of possible sources of danger and an earlier reaction thereto is possible. Both the comfort and the safety of the operation of a motor vehicle, which is suitably equipped, are thereby increased.

For example, an object could be presumed on a shoulder of a road which because of the normal illumination is in semi-darkness however. Accordingly it is known that in the region of roads, in particular such passing through wilderness, animals are more frequently present in the region of the road. Accordingly, it is important for assessing the possible risk in the case of an object presumed in the semi-darkness to recognize if the object is in fact an animal that can possibly behave unpredictably or not. With the help of the motor vehicle described here, the viewing direction of the driver is analyzed and the light beam of the headlamp adapted in such a manner that the region of attention, in which the driver looks, is better illuminated. In this way, the object can be recognized more quickly so that the driver may react correctly for example on recognizing an animal by reducing the travelling speed. Otherwise, the object can be possibly identified as an immovable object and the driver can continue driving normally.

In a first further configuration, the headlamp can be designed in order to adapt brightness and/or light color in a locally limited manner in order to emphasize the region of attention. Emphasizing the region of attention can then take place by locally adapting the brightness, the light color, the color temperature or a combination thereof. The remaining light beam can be substantially unchanged. Accordingly, the brightness in the region of attention for example can be increased compared with the normal brightness. In addition to this, the light color can be adapted in the region of attention. This can serve to amplify contrasts. Signs for example can become better legible as a result. To this end, the headlamp can emit at least two different light colors or select the light color from a larger spectrum.

This can take place in particular with a stationary or static headlamp, i.e. without swiveling the headlamp for emphasizing the region of attention. Because of this, the illumination can be otherwise maintained, only the region of attention within the illuminated zone is emphasized. This makes possible thorough illumination of the remaining regions. Otherwise, the headlamp can be of the swivel type, for example for level balancing or for other purposes, but for the purpose of emphasizing this is not necessary within the scope of this configuration.

According to a further aspect it can be provided that the controller is designed in order to divide a field of vision of the driver into segments and control the light beam so that the segment or the segments, in which the region of attention of the driver is situated, are emphasized. In this way, simple identification of the region of attention can take place by way of the position of the driver's head and its segment under observation.

A further configuration provides that the headlamp has a plurality of illumination elements, which in each case have a predetermined beam focus. Such a plurality can be more than three illumination elements. A multitude, for example more than ten illumination elements, can also be provided for each headlamp. With the help of the plurality of illumination elements with different individual beam focuses the light beam of the headlamp can be adapted with respect to its entire beam focus, its entire beam distribution and its entire brightness. The illumination elements in a configuration can be arranged in a matrix. With the help of such a matrix, the illumination elements can be assigned to corresponding segments of the field of vision. Here, an illumination element can be assigned to a segment, an illumination element to multiple segments and/or multiple illumination elements to one segment. In a further configuration it can be provided that the illumination elements can emit different light outputs, light colors, color temperatures or a combination thereof. This makes possible even further reaching possibilities for influencing the light beam of the headlamp.

In a further possible configuration of the motor vehicle the headlamp can be a pixel headlamp. Through different means in each case, pixel headlamps allow a simple adaptation of their light beam. Pixel headlamps can for example include a multiplicity of light elements that can be activated individually or in groups, which can be changed or switched on and switched off as required, in order to suitably influence the beam.

Alternatively or additionally, laser headlamps can be employed. Laser headlamps have a wide adjustment spectrum and thus allow in particular the illumination of a very narrow region with a large range by bundling the light quantity that is available to a narrow cone. In addition, they have a major luminous efficiency, which further favors a large range, as a result of which the distant view of the driver is improved. At the same time, the laser headlamps can be oriented so that they minimize influencing the oncoming traffic.

According to a further aspect of the motor vehicle described here it can be provided that the controller is equipped in order to adapt the brightness of the headlamp dependent on location as a function of the viewing direction of the driver. Accordingly, the light beam can be adjusted brighter for regions of attention located further in the distance than for objects located nearby.

A further possible further configuration of the motor vehicle provides an interior illumination which is designed in order to adequately illuminate the head of the driver when travelling in darkness in order to make possible capturing the head of the driver by means of the camera. This illumination can take place above all without glare so that the driver is not negatively affected. By such illumination it is ensured that the viewing direction of the driver remains easily detectable at all times, in particular during the night, when obviously no adequate ambient brightness is available, but when adaptation of the illumination to the viewing direction of the driver is most practical. The interior illumination can be provided by a suitably designed instrument illumination or by a separate illumination, which is directed at the driver. For illumination, light frequencies can be used for example which are relatively insensitive to a human being.

According to a further possible configuration, the camera can be arranged in an A-pillar, a center console, a roof console or in a rearview mirror, A-pillar, center console, roof console or rearview mirror are located in travelling direction in front of the driver and thus make possible capturing the face of the driver.

According to a further configuration of the motor vehicle, at least one second camera can be provided which is directed at the head of the driver, the second camera likewise being connected to the controller. By using two cameras, a more accurate determination of the viewing direction of the driver is possible, so that a precise adaptation of the headlamps as a function of the viewing direction is ensured. The use of two cameras can also make possible increasing the reliability of the capturing of the viewing direction of the driver since in most situations two different evaluations of the viewing direction of the driver can be carried out and compared with one another. Furthermore, two cameras can make possible a three-dimensional evaluation.

In a further conceivable configuration of the motor vehicle, the camera or one of the cameras can be an infrared camera. Infrared cameras are sensitive also in darkness. Accordingly, the infrared camera can make possible capturing the viewing direction of the driver without or with very little illumination of the same even in darkness.

A method for operating a motor vehicle including a headlamp having an adaptable light beam facing in travelling direction towards the front is disclosed in which a head of a driver of the motor vehicle is captured by means of a camera arranged in the passenger compartment of the motor vehicle. Data generated by the camera is used to determine a region of attention of the driver. The tight beam of the headlamp is adapted as a function of the region of attention of the driver in such a manner that the region of attention is emphasized. This can take place in particular with a static headlamp, i.e. without swiveling of the headlamp. Because of this, the illumination can otherwise be kept the same, only the region of attention is emphasized. By evaluating the viewing direction and adapting the headlamp to the region of attention of the driver, better illumination of the regions, which are currently of interest to the driver, is achieved. The region of interest, according to an aspect, can be determined by means of the head position and the viewing direction of the driver.

According to a first possible further configuration, the headlamp can be designed in order to adapt a brightness and/or a light color, in a locally limited manner, in order to emphasize the region of attention. To this end, the headlamp can emit at least two different light colors or adapt the light color within a given spectrum. A further development of the method includes adapting a light beam of a pixel headlamp and/or a laser headlamp. Pixel headlamps which include a pixel matrix may also be used and allow simple emphasizing of the region of attention.

According to a further possible further configuration of the method, an adaptation of the light beam of the headlamp can be performed only when the driver maintains his region of attention within preset tolerances over a preset period of time or changes only his viewing direction only with a speed that is slower than a limit speed. It is normal for drivers of the vehicle to allow their eyes to wander in certain phases. Jumping to and fro between different regions of attention is also normal, for example between display instruments, the road, review mirrors and the like, but also with respect to multiple regions on the road. If a steady adaptation of the headlamps to the viewing direction of the driver takes place, the illumination of the road in the event of a wandering gaze the illumination of the road may change very rapidly. Thus, adaptation of the headlamps may be carried out only when the view of a driver is constant within certain tolerances, resulting in a more targeted method of illumination. The preset tolerances can for example define a swivel angle, within which the view of the driver may be swiveled. Accordingly, for example ±5" or ±10° or ±15" can be defined. According to a further aspect, multiple regions of attention, between which the view of the driver recurrently changes, can be emphasized in the case of a jumping view.

In a further possible configuration of the method, a view of the driver resting on an object can be detected and the light beam of the headlamp adjusted so that the object is illuminated. This is particularly practical for example for the already described case of an animal being present on a shoulder of a road. A corresponding object fixed by the driver can be identified for example by the view of the driver, correlated to the speed of the motor vehicle, changes in a certain way which is determined by the object relative to the motor vehicle.

A possible further development of the method provides that a second camera is used in order to capture the head of the driver. Data of the first camera and of the second camera are compared with one another and upon deviation of the results may be weighed by which camera data is used. Because of this, greater reliability of the method can be achieved and capturing of the view can also take place when a clear view of one of the cameras on the face of the driver is not possible. This can be the case for example when a driver scratches his head or similar. By comparing the two camera data, a three-dimensional image can be additionally created, which allows a more accurate determination of the viewing direction of the driver.

According to a further possible configuration of the method, the viewing direction of the driver can be determined from eye movements and/or head movements of the driver. It has been determined that a change in viewing direction in a certain direction frequently includes both, swiveling of head and swiveling of eyes. Here, the head is generally moved more quietly than the eyes. By evaluating the head position and the viewing direction of the driver, a more accurate determination of the spatial focus of attention of the driver can thus take place.

A further independent aspect relates to a computer program product with a non-transitory computer-readable storage medium, on which the commands are embedded which, when they are executed by a computer unit or controller, cause the components to carry out a method of the aforementioned type. This method can be the method for calculating the reset time or the method for operating a motor vehicle or both.

The present disclosure further provides a device with at least one headlamp facing forward in travelling direction, the light beam of which is adaptable and with at least one camera arranged in the passenger compartment of the motor vehicle, which can capture a head of a driver of the motor vehicle. A controller is configured to determine a region of attention of the driver from the camera signal, and to change the light beam of the headlamp as a function of the region of attention of the driver in order to emphasize the region of attention. According to another aspect of the device, laser headlamps or pixel headlamps may be used as headlamps.

A first possible further configuration provides that the headlamp is equipped in order to locally adapt a brightness, a light color, a color temperature or a combination thereof in and/or round about the region of attention. It can be provided, furthermore, that the controller is configured in such a manner that an adaptation of the light beam of the headlamp is performed only when the driver maintains his viewing direction within predetermined tolerances.

A further possible configuration of the device can provide a controller configured to capture a view of the driver resting on an object and adapt the light beam of the headlamp so that the object is illuminated.

A further possible configuration of the device can provide a controller configured to divide the field of vision of the driver into segments and control the light beam so that the segment or segments, in which the region of attention of the driver is located, are emphasized.

In a further possible configuration of the device, a second camera can be provided which captures the head of the driver. The controller may be configured to compare data of the first camera and of the second camera with one another. The controller is configured, furthermore, to weigh, upon deviation of the results of the two cameras, which of the camera data is used.

A further possible configuration of the device can provide a controller configured to determine the viewing direction and/or the region of attention of the driver from eye movement of the driver and/or head movements of the driver. According to a configuration of the device, a corresponding camera can be an infrared camera.

The device, furthermore, can include an interior illumination configured to illuminate the head of the driver so that the at least one camera can reliably capture a viewing direction of the driver even in darkness.

The device can include a computer unit in the controller, which performs the necessary calculations for realizing the method. The computer unit can be linked with a storage unit, on which a computer program product of the type described before is stored.

Instead of a controller, multiple controllers can also be provided, which can communicate with one another. A controller can then be a main controller with the other controllers being dependent on the inputs of the main controller. Accordingly, a separate headlamp controller can be provided for example which communicates with a corresponding camera controller.

BRIEF DESCRIPTION OF THE DRAWINGS

The present disclosure will hereinafter be described in conjunction with the following drawing figures, wherein like numerals denote like elements.

FIG. 1 shows a top view of a motor vehicle;

FIG. 2 illustrates a traffic situation on a road;

FIG. 3 illustrates a flow diagram of the described method; and

DETAILED DESCRIPTION

Figure 4:
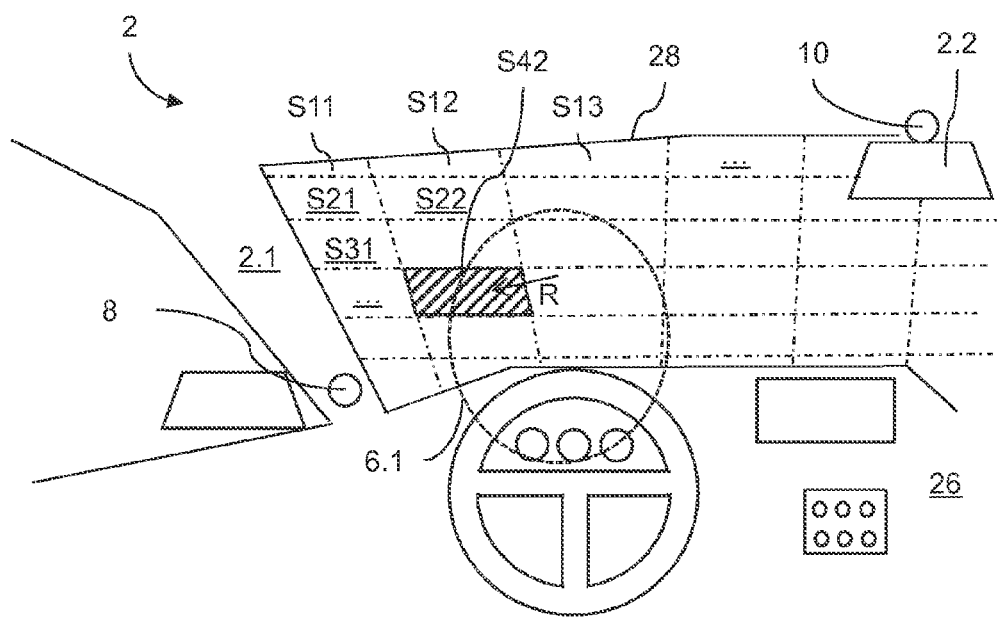
FIG. 4 shows an interior space of the motor vehicle.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a motor vehicle 2 equipped with a device 4 (framed in dashed lines) for adaptively controlling an illumination of the motor vehicle to a viewing direction R of a driver 6 of the motor vehicle 2. The device 4 includes two cameras 8, 10, which are directed at a head 6.1 of the driver 6. The camera 8 is arranged in an A-pillar 2.1. The camera 10 in a rearview mirror 2.2. The cameras 8, 10 can be infrared cameras. The cameras 8, 10 capture the eyes and the orientation of the head 6.1 of the driver 6. Through conventionally image-evaluating methods a viewing direction R of the driver can be determined. An interior illumination 11 may be used to illuminate the head 6.1 of the driver 6.

The cameras 8, 10 are connected to a controller 12. The controller 12 includes a processor 14 and a non-transitory computer readable storage unit 16. The controller 12 identifies the viewing direction of the driver 6 with the help of the processor 14. The processor 14 to this end has loaded a computer program product into the storage unit 16, which enables it for carrying out the calculation. The computer program product implements a method described below in reference to FIG. 3.

The motor vehicle 2, furthermore, is equipped with two headlamps 18, 20 which are directed in travelling direction x towards the front. The headlamps 18, 20 are equipped in such a manner that they allow a local change of the brightness, the light color, the color temperature of a light beam 21 or a combination thereof. A region of attention or point of interest WOO of the driver 6 can thereby be emphasized. The brightness in the region of attention or at the POI can be increased in such a manner that the objects that are present therein are better visible. In order to further emphasize the region of attention or the POI adaptation of the tight color or the color temperature can be used to increase the contrast, for example for reading signs. The light color, according to an embodiment, can be adapted in a part region of the RGB color space or another color space model, in other embodiments, at least two different colors are adjustable.

The headlamps 18, 20 in this case may be configured as pixel headlamps. The pixel headlamps 18, 20 include a multiplicity of illumination elements 18.1-18.4, 20.1-20.4, which in each case have individual beam focuses. The illumination elements 8.1-18.4, 20.1-20.4 for this purpose can be arranged for example on a curved surface and/or be differently oriented. In addition, the illumination elements 18.1-18.4, 20.1-20.4 are arranged in a matrix.

The illumination elements 18.1-18.4, 20.1-20.4 can be additionally regulated individually in their brightness, and in some configurations in their illumination color. Because of this, individual regions within the illumination field of the headlamps 18, 20 can be emphasized in a targeted manner by correspondingly activating the illumination elements 18.1-18.4, 20.1-20.4.

Alternatively or additionally, the headlamps can be configured as laser headlamps.

The headlamps 18, 20 are connected to the controller 12 and can be adjusted by the controller 12. The headlamps 18, 20 can have an additional control, which converts general control instructions of the controller 12 into a concrete control of the headlamps 18, 20. In other configurations, this can be taken over by the controller 12. The control of the headlamps 18, 20 takes place as a function of the viewing direction R of the driver 6. The controller can be affected in such a manner that emphasizing follows the region of attention of the driver 6. If the driver jumps to and fro between multiple regions of attention, for example between a vehicle travelling ahead and a road sign, multiple regions of attention can be emphasized simultaneously in some configurations.

FIG. 2 shows a traffic situation on a road 22. The motor vehicle 2 is shown in two positions A, B. An object 24 is located on the shoulder of the road 22. The driver 6 registers the object 24 by looking in the viewing direction RA. A region of attention or POI continuously rests on the object 24. While the motor vehicle 2 continues travelling in travelling direction x, the viewing direction R continuously changes. In location B the viewing direction is RB, the region of attention or POI however remains spatially unchanged.

The change of the viewing direction R is captured by the device 4 and can be correlated to the speed of the motor vehicle 2. Because of this it can be determined that the view of the driver 6 rests on a constant point, the object 24 in this case.

The controller 12 can then control the headlamps 18, 20 in such a manner that the object 24 is illuminated. To this end, swiveling the headlamps 18, 20 or swiveling of the beam focus may be required. Furthermore, a concentration of the beam on the object 24 may be necessary. In addition, the brightness of the headlamps 18, 20 can be regulated in order to illuminate the object 24.

FIG. 3 shows a flow diagram of the described method. In a first step, a viewing direction of the driver 6 is determined. Determination of the viewing direction is continued. From the data which are thereby determined, the speed of the change of the viewing direction R is examined in the next step and as a function of the speed, a case distinction made.

If the eye loosely wanders around without a given target, the method starts from the beginning. If the view is constant within certain parameters, for example within a viewing angle range of 20°, or if the viewing direction swivels slowly, for example with less than 45° per second, the headlamps 18, 20 are suitably adapted to the viewing direction. If the view changes in correlation to the speed in such a manner that a fixed point outside the motor vehicle is aimed at, the fixed point is determined and the fixed point suitably illuminated.

FIG. 4 shows an interior space 26 of the motor vehicle 2.

The two cameras 8, 10 are directed at the driver's head 6.1 shown in dashed lines. The camera 8 for this purpose is arranged in the A-pillar 2.1, the camera 10 on the mirror 2.2. The field of vision of the driver 6 on a windshield 28 is divided into rows and columns which define a multitude of segments, e.g. S11, S12, S13, S21, S22, S31, S42, etc. With the help of the camera 8, 10, it is identified from the position of the head 6.1 of the driver 6 and his viewing direction R that his view currently passes through the segment S42. The region of attention accordingly is located in this segment.

The illumination elements 18.1-18.4, 20.1-20.4 are correlated in the controller 12 to the multitude of segments e.g. S11, S12, S13, S21, S22, S31, S42, etc. In addition, the current position of the driver's head 6.1 can be taken into account with the correlation. If the view of the driver passes through the segment S42, the associated illumination elements from the illumination elements 18.1-18.4, 20.1-20.4 are suitably activated by means of the controller 12 in order to emphasize the region of attention POI located in viewing direction R.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle comprising:
at least one headlamp directed in a forward travelling direction and configured to generate an adaptable light beam;
at least one camera oriented in the motor vehicle and operable to capture positional data relating to a head of a driver of the motor vehicle; and
a controller in data communication with the at least one camera and configured to determine a region of attention for the driver from the positional data transmitted by the camera, and to control the adaptable light beam of the at least one headlamp for emphasizing the region of attention to the driver,
wherein the at least one camera comprises first and second cameras in data communication with the controller, oriented in the motor vehicle at different locations and operable to capture the positional data, wherein the controller is configured to determine the region of attention of the driver based on the positional data from the first and second cameras.

2. The motor vehicle according to claim 1, wherein the controller is configured to control the at least one headlamp to adjust a brightness, a light color, a color temperature or a combination thereof of the adaptable light beam in a locally limited manner for emphasizing the region of attention while a remainder of the adaptable light beam is substantially unchanged.

3. The motor vehicle according to claim 1, wherein the controller is configured to divide a field of vision of the driver into a plurality of segments, to determine at least one of the plurality of segments that correspond with the region of attention and to control the at least one headlamp so that the at least one of the plurality of segments in which the region of attention is located is emphasized.

4. The motor vehicle according to claim 1, wherein the at least one headlamp comprises a laser headlamp.

5. The motor vehicle according to claim 1, wherein the controller is configured to compare the data of the first camera and the second camera to determine a deviation, and based the determination, the controller is configured to select which camera data is used.

6. The motor vehicle according to claim 1, wherein the at least one headlamp comprise a plurality of illumination elements, each illumination element having a preset beam focus.

7. The motor vehicle according to claim 6, wherein the plurality of illumination elements are arranged in a matrix.

8. The motor vehicle according to claim 6, wherein the plurality of illumination elements are configured to emit at least one of a different light color and a different light output.

9. The motor vehicle according to claim 1, wherein the controller is configured to control the adaptable light beam to change at least one of a light color and a brightness of the light beam in the region of attention while a remainder of the adaptable light beam is substantially unchanged.

10. The motor vehicle according to claim 9, wherein a field of vision of the driver is divided into a plurality of segments, the controller is configured to determine at least one of the plurality of segments that correspond with the region of attention and wherein the controller is configured to control the at least one headlamp so the at least one of the plurality of segments, in which the region of attention of the driver is located, are emphasized.

11. The motor vehicle according to claim 9, wherein the at least one headlamp comprises at least one of a laser headlamp and a pixel headlamp.

12. The motor vehicle according to claim 9, wherein the controller is configured to compare positional data from the first and second camera and weight the positional data based on the comparison.

13. A method for operating a motor vehicle having at least one headlamp generating an adaptable light beam in a forward travelling direction, the method comprising:
capturing positional data for a head of a driver of the vehicle with at least one camera, the at least one camera comprising first and second cameras in data communication with a controller, oriented in the motor vehicle at different locations and operable to capture the positional data;
determining, by the controller, at least one region of attention for the driver based on the positional data; and
adjusting the adaptable light beam as a function of the region of attention for the driver such that the region of attention is emphasized for the driver,
wherein the controller is configured to determine the region of attention of the driver based on the positional data from the first and second cameras.

14. A computer program product with a non-transitory computer-readable storage medium, on which a set of commands are embedded which when executed by the controller carry out the method according to claim 13.

* * * * *